US005170167A

United States Patent [19]

Rix et al.

[11] Patent Number: 5,170,167

[45] Date of Patent: Dec. 8, 1992

[54] REFLECTOR FOR ELECTROMAGNETIC ENERGY

[75] Inventors: Clifford Rix, Gosport; Mark T. Gilbert, Hayling Island, both of England

[73] Assignee: The Secretary of State for Defence in Her Majesty's Britannic Government, London, United Kingdom

[21] Appl. No.: 761,910

[22] PCT Filed: Feb. 9, 1990

[86] PCT No.: PCT/GB90/00200

§ 371 Date: Sep. 25, 1991

§ 102(e) Date: Sep. 25, 1991

[87] PCT Pub. No.: WO90/10318

PCT Pub. Date: Sep. 7, 1990

[30] Foreign Application Priority Data

Feb. 28, 1989 [GB] United Kingdom ................ 8904474

[51] Int. Cl.[5] ........................ G01S 15/23; G01S 15/14

[52] U.S. Cl. .................................... 342/11; 342/370; 343/911 R

[58] Field of Search ............. 342/11, 370; 343/911 R, 343/911 L

[56] References Cited

U.S. PATENT DOCUMENTS 3,204,244 8/1965 Prache ........................... 343/911 R

FOREIGN PATENT DOCUMENTS

WO-/A/8900773 1/1989 PCT Int'l Appl. .

WO-/A/890932 9/1989 PCT Int'l Appl. .

*Primary Examiner*—Gilberto Barrón, Jr.
*Attorney, Agent, or Firm*—Nixon & Vanderhye

[57] ABSTRACT

A lightweight radar reflector comprising two converging lenses (21 and 22) with a reflecting surface (26) applied to the outer convex surface of one of the lenses. The lenses are preferably meniscus lenses provided with peripheral mating flanges (24 and 25) for assembly. In one form the lenses are moulded from a mixture of silica powder and polyester resin to give a dielectric constant of 3.414 for each lens. In one arrangement there may be provided means to allow the lenses to be set to a predetermined separation so that the radar reflectance of the combination can be adjusted. In a further form the lenses may comprise thin shells of polycarbonate filled with silica powder to produce the desired dielectric constant.

33 Claims, 2 Drawing Sheets

REFLECTOR FOR ELECTROMAGNETIC ENERGY

BACKGROUND OF THE INVENTION

1. Field of the Invention

The invention relates to reflectors for electromagnetic radiation and in particular, though to exclusively, to radar reflectors for enhancing the radar cross-section of an object.

2. Discussion of Prior Art

GB Patent Application No. 2194391A describes a reflector comprising a spherical lens, having a dielectric constant of substantially equal to 3.414 with a reflective coating formed over a part of the spherical surface of the lens. Electromagnetic radiation, e.g. radar, is focussed by the lens on to the reflector and then reflected back towards the radar source. When suitably designed with the reflector covering about one half of the lens a highly uniform radar cross section covering substantially a hemisphere of angles of incidence resulted. This meant that two lenses, back-to-back, could provide a substantially uniform radar cross-section, independent of the direction of incidence of the radiation. Such reflectors provide a simpler and cheaper alternative to Luneberg lenses and their uniform response makes them suitable for use, for example, on top of yacht masts to provide suitably large echoes on ships' radar scanners to mimimise the likelihood of collisions.

The invention provided a material with the correct dielectric constant and low loss transmission characteristics. However the weight of the reflector is a critical factor in various applications and a compromise was needed between maximising the radar cross-section and mimimising the weight.

SUMMARY OF THE INVENTION

The object of the present invention is to provide an improved reflector having a lightweight structure compared with the prior art arrangement.

The invention provides a reflector for electromagnetic radiation having: a first input converging lens; a second converging lens coaxial with said first lens and having a convex rear surface; and a reflective coating applied to the convex surface of the second lens; the lenses being arranged such that electromagnetic energy from a source incident on the first lens is refracted onto the second lens then reflected from the reflective coating back towards the source of the energy.

In a particularly advantageous arrangement for use as a radar reflector the lenses have a dielectric constant of 3.414.

Advantageously the lenses are moulded from silica flour in a polyester resin binder. In a convenient arrangement the lenses are meniscus lenses, the second lens being provided around its periphery with an annular flange and the first lens being substantially hemispherical and provided with a rebated portion around the periphery thereof for mating with a complementary portion of the periphery of the flange. The reflecting surface is preferably a zinc spray coating.

The angular response of the reflector may be adjusted by providing means to adjust the separation of the two lenses.

BRIEF DESCRIPTION OF THE DRAWINGS

The invention will now be described by way of example only with reference to the accompanying Drawings of which.

DETAILED DISCUSSION OF PREFERRED EMBODIMENTS

Figure 1:
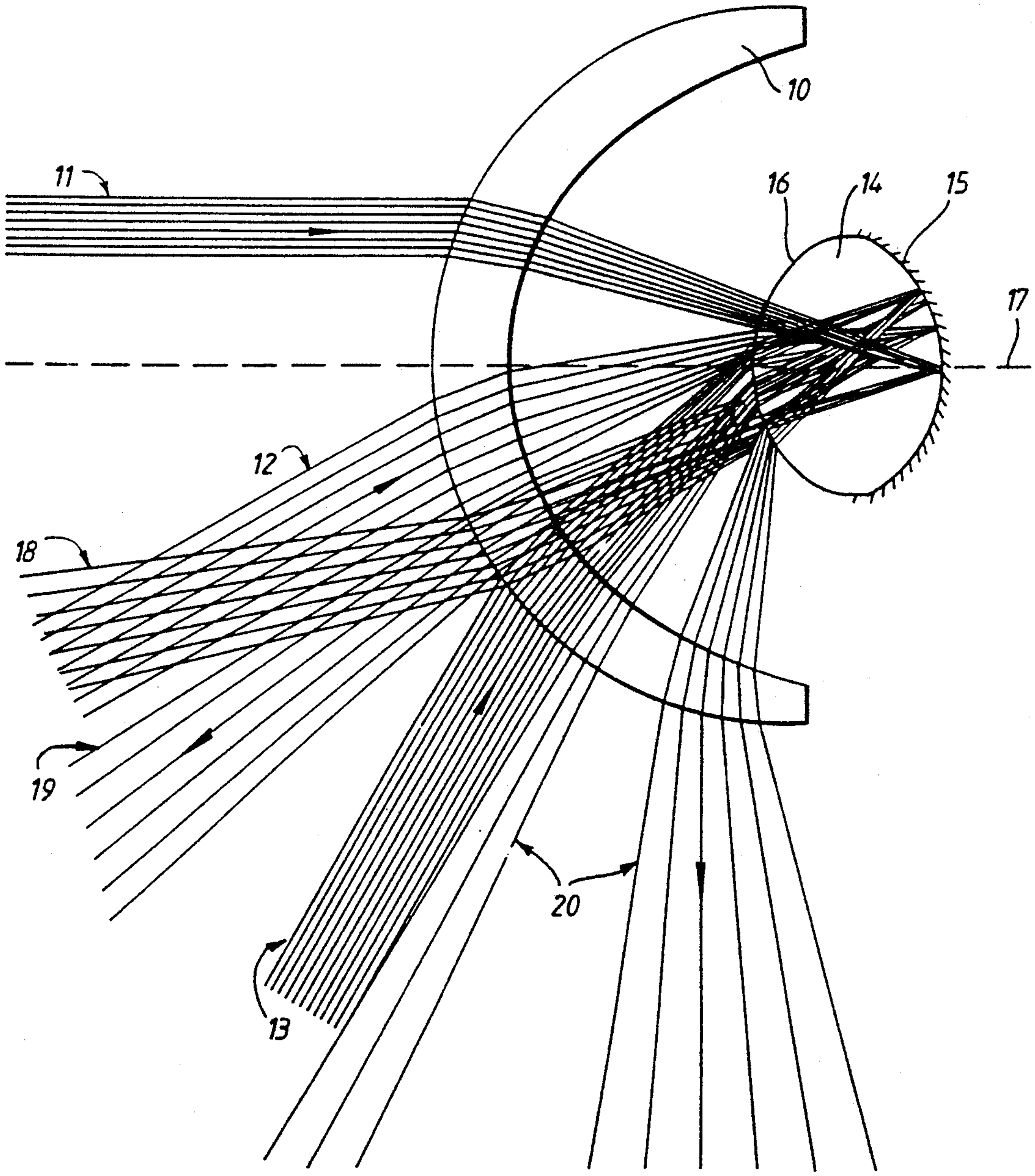
FIG. 1 is a schematic view of a reflector according to the invention, showing various radar ray tracings; and FIGS. *2a* and *2b* are sectional and plan views of one reflector arrangement.

As can be seen in FIG. 1 a passive radar target comprises a first hemispherical meniscus lens 10 which focuses microwave energy 11–13 towards a second lens 14. Microwave energy incident on the second lens 14 is focused on the rear convex surface 15 of the second lens which is coated with a zinc spray radar reflective coating. The two lenses are made from silica flour in a polyester resin binder.

The rear convex surface 15 of the lens 14 is part spherical while the front surface 16 is a convex axially symmetric surface which is flattened near the lens axis 17. The dielectric constant of the silica flour/polyester resin is close to 3.414, which was described in GB Patent Application No. 2194391A as the optimum value for a radar reflector using a single solid lens/reflector. The spacing, dimensions and surface curvatures of the lens are design variables selected for the desired radar cross-section and polar response (including monostatic or bistatic operation).

The incident radar beams 11, 12 and 13 illustrate computer generated ray tracings for angles of incidence of respectively 0°, 30° and 60° and the respective reflected beams are represented by the references 18, 19 and 20.

Figure 2A:
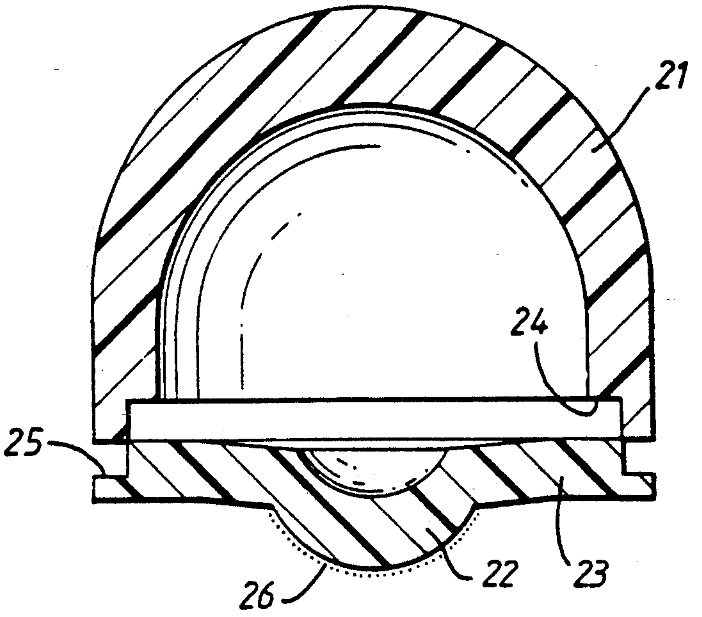
Figure 2B:
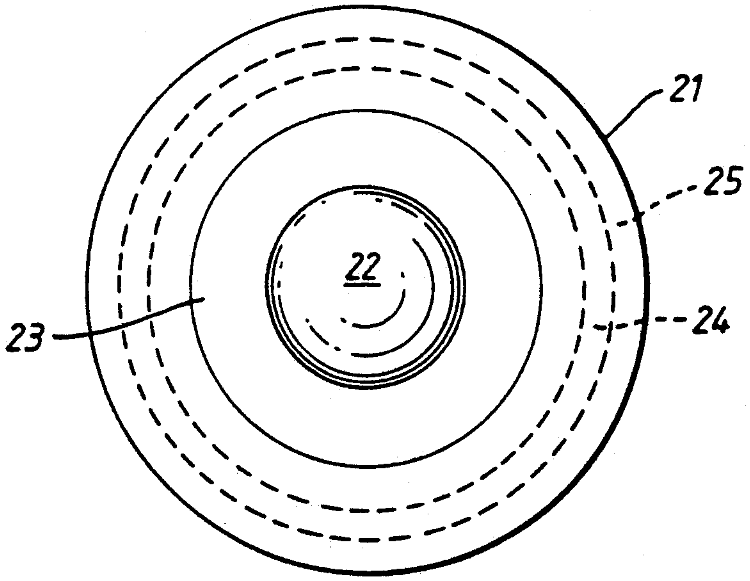

FIG. 2 shows a practical arrangement of the radar reflector in which the first and second lenses 21 and 22 are both moulded from silica flour in polyester resin. The second lens 22 is formed with an integral annular flange 23 which serves to provide a means to secure the two lenses together with correct spacing therebetween. The outer peripheries of the first lens 22 and flange 23 are provided with complementary rebated surfaces 24, 25 for correct assembly of the two lenses. The part spherical outer surface 26 of the second lens 22 is coated by means of a zinc spray.

In one arrangment having the following approximate dimensions:

| | |
|---|---|
| diameter of first hemispherical lens = | 19 cm |
| diameter of first lens = | 13 cm |
| the measured radar cross-sections were: | |
| X band: | 4.1 m2 |
| J band: | 7.3 m2 |

Compared with the prior art solid lens arrangement, the present invention has a considerable advantage in reduced weight for the same radar cross-section performance. In addition the mouldings are considerably easier to make since a large single sphere of 19 cm diameter, for example, would produce considerable exothermic heat on curing which would lead to cracking and consequently increase the energy loss in the lens.

In one arrangement an adjustment means has been provided so that the two separate lens portions shown in FIG. 2 can be set to an adjustable separation within predetermined limits. By this means the angular response of the reflector can be adjusted in dependence on the selected application.

We claim:

1. A reflector for electromagnetic radiation comprising a lens of uniform dielectric constant and a reflector comprising:

a first meniscus input converging lens (10.21);

a second meniscus converging lens (14.22) coaxial with said first lens and having a convex rear surface; and a reflective coating (15.26) applied to the convex surface of the second lens;

the lenses being arranged such that electromagnetic energy (11) from a source incident on the first lens is refracted onto the second lens then reflected (18) from the reflective coating back towards the source of the energy.

2. A reflector for electromagnetic radiation as claimed in claim 1 wherein the lenses have a dielectric constant of 3.414.

3. A reflector for electromagnetic radiation as claimed in claim 2 wherein the lenses are moulded from silica flour in a polyester resin binder.

4. A reflector for electromagnetic radiation as claimed in claim 3 wherein the reflecting coating (15,26) is a zinc spray coating.

5. A reflector for electromagnetic radiation as claimed in claim 4 wherein the second lens (22) is provided around its periphery with an annular flange (23) and the first lens (21) is substantially hemispherical and provided with a rebated portion (24) around the periphery thereof for mating with a complementary portion (25) of the periphery of the flange (23).

6. A reflector for electromagnetic radiation as claimed in claim 5 further including means for spacing of the two lenses to a predetermined value.

7. A reflector for electromagnetic radiation as claimed in claim 2 wherein the lenses comprise shells filled with a dielectric material.

8. A reflector for electromagnetic radiation as claimed in claim 7 wherein said shells are comprised of a polycarbonate material.

9. A reflector for electromagnetic radiation as claimed in claim 8 wherein the dielectric material is powdered silica.

10. A reflector for electromagnetic radiation as claimed in claim 9 wherein the reflecting coating (15.26) is a zinc spray coating.

11. A reflector for electromagnetic radiation as claimed in claim 10 wherein the second lens (22) is provided around its periphery with an annular flange (23) and the first lens (21) is substantially hemispherical and provided with a rebated portion (24) around the periphery thereof for mating with a complementary portion (25) of the periphery of the flange (23).

12. A reflector for electromagnetic radiation as claimed in claim 11 wherein there is further provided a means for spacing of the two lenses to a predetermined value.

13. A reflector for electromagnetic radiation as claimed in claim 7 wherein the dielectric material is powdered silica.

14. A reflector for electromagnetic radiation as claimed in claim 1 wherein the lenses are moulded from silica flour in a polyester resin binder.

15. A reflector for electromagnetic radiation as claimed in claim 14 wherein the reflecting coating (15.26) is a zinc spray coating.

16. A reflector for electromagnetic radiation as claimed in claim 15 wherein the second lens (22) is provided around its periphery with an annular flange (23) and the first lens (21) is substantially hemispherical and provided with a rebated portion (24) around the periphery thereof for mating with a complementary portion (25) of the periphery of the flange (23).

17. A reflector for electromagnetic radiation as claimed in claim 16 wherein there is further provided a means for spacing of the two lenses to a predetermined value.

18. A reflector for electromagnetic radiation as claimed in claim 1 wherein the lenses comprise shells filled with a dielectric material.

19. A reflector for electromagnetic radiation as claimed in claim 18 wherein said shells are comprised of a polycarbonate material.

20. A reflector for electromagnetic radiation as claimed in claim 19 wherein the dielectric material is powdered silica.

21. A reflector for electromagnetic radiation as claimed in claim 18 wherein the dielectric material is powdered silica.

22. A reflector for electromagnetic radiation as claimed in claim 21 wherein the reflecting surface (15.26) is a zinc spray coating.

23. A reflector for electromagnetic radiation as claimed in claim 22 wherein the second lens (22) is provided around its periphery with an annular flange (23) and the first lens (21) is substantially hemispherical and provided with a rebated portion (24) around the periphery thereof for mating with a complementary portion (25) of the periphery of the flange (23).

24. A reflector for electromagnetic radiation as claimed in claim 22 further including a means for spacing of the two lenses to a predetermined value.

25. A reflector for electromagnetic radiation as claimed in claim 1 wherein the reflecting coating (15, 26) is a zinc spray coating.

26. A reflector for electromagnetic radiation as claimed in claim 1 further including means for spacing of the two lenses to a predetermined value.

27. A reflector for electromagnetic radiation comprising a lens of uniform dielectric constant and a reflector, comprising: a first input converging lens (10.21);

a second converging lens (14.22) coaxial with said first lens and having a convex rear surface; and a reflective coating applied to the convex surface of the second lens;

the lenses being arranged such that electomagnetic energy (11) from a source incident on the first lens is refracted onto the second lens then reflected (18) from the reflective coating back towards the source of the energy, wherein the lenses comprise shells filled with a dielectric material, wherein the second lens (22) is provided around its periphery with an annular flange (23) and the first lens (21) is substantially hemispherical and provided with a rebated portion (24) around the periphery thereof for mating with a complementary portion (25) of the periphery of the flange (23).

28. A reflector for electromagnetic radiation as claimed in claim 27 wherein the lenses have a dielectric constant of 3.414 .

29. A reflector for electromagnetic radiation as claimed in claim 27 wherein the lenses are moulded from silica flour in a polyester resin binder.

30. A reflector for electromagnetic radiation as claimed in claim 27 wherein said shells are comprised of a polycarbonate material.

31. A reflector for electromagnetic radiation as claimed in claim 27 wherein the dielectric material is powdered silica.

32. A reflector for electromagnetic radiation as claimed in claim 27 wherein the reflecting coating (15.26) is a zinc spray coating.

33. A reflector for electromagnetic radiation as claimed in claim 27 further including means for spacing of the two lenses to a predetermined value.

* * * * *